PROCESS FOR PRODUCING A NOVEL TEXTURED YARN

Original Filed Nov. 20, 1969 2 Sheets-Sheet 1

INVENTOR
MICHEL BUZANO
BY Sherman & Shalloway
ATTORNEYS

PROCESS FOR PRODUCING A NOVEL TEXTURED YARN

Original Filed Nov. 20, 1969 2 Sheets-Sheet 2

INVENTOR
MICHEL BUZANO
BY Sherman & Shadoway
ATTORNEYS

United States Patent Office

Re. 28,150
Reissued Sept. 3, 1974

28,150
PROCESS FOR PRODUCING A NOVEL TEXTURED YARN

Michel Buzano, Villeurbanne, France, assignor to Rhone-Poulenc-Textile, Paris, France Original No. 3,683,611, dated Aug. 15, 1972, Ser. No. 878,274, Nov. 20, 1969. Application for reissue June 7, 1973, Ser. No. 367,959
Claims priority, application France, Nov. 22, 1968, 175,055
Int. Cl. D02g *1/02*
U.S. Cl. 57—157 TS 2 Claims

Matter enclosed in heavy brackets [ ] appears in the original patent but forms no part of this reissue specification; matter printed in italics indicates the additions made by reissue.

ABSTRACT OF THE DISCLOSURE

Continuous filaments of thermoplastic material are provided wherein such filaments contain a helicoidal curling and/or a residual twist couple. The filaments have a cross section which is substantially the shape of a bean, such cross section varying slightly along the length of the filaments. The filaments are produced by a process which comprises creating an initial twist in an individual strand or in an assembly of a number of strands having a high count per strand and a small number of strands per assembly; thermally treating the twisted strands or assembly of strands; blocking such twist at a point; and separating the single strand or assembly of strands at such point and winding them up. Such a process is characterized in that the point of separation of the yarn is located immediately at the outlet of the heat treatment yarns while the yarns are still in a plastic state. The apparatus necessary for carrying out such process comprises a delivery means for providing the yarn by unwinding, means for separating the strands or assembly of strands, means for initiating the twisting, means for heating the twisted yarn, and means for receiving the yarn. Such apparatus can additionally contain drawing means.

The present invention is directed to a novel textured yarn, a process for producing the same, and apparatus for use in conjunction therewith. More particularly, the present invention is directed to such textured yarn in which the same is characterized by a helicoidal curling and/or residual twist couple, the same having substantially the shape of a bean.

The method of producing textured yarns from artificial or synthetic thermoplastic material by twisting, fixing and untwisting has been known for a long time. Thus, yarns have been obtained with a helicoidal curling and great elasticity from continuous yarns of artificial or synthetic thermoplastic material.

Such yarns can be obtained continuously either by false twisting with a false twisting spindle, or by driving the twisting back, by twisting two yarns together, by thermally fixing the twisting, and then by separating the ends of the yarn, the equilibrium of the tensions being assured, for example, by a parallelogram device, at the time of this separation.

Such yarns, produced as above and in accordance with the present invention, are eminently suitable for a wide variety of applications, the same being particularly suited in the production of hosiery. Thus, for example, when monostrand yarns are used in the production of stockings this becomes a very expensive solution to the problem of producing a satisfactory stocking yarn.

It has also been known that elastic knits can be prepared from non-elastic yarns with a residual twist couple by alternately knitting a row of S twist yarn and a row of Z twist yarn. Such a solution to the problem at hand as well as those discussed above are not entirely satisfactory, however, because in addition to elasticity, a stocking yarn is required to have an agreeable touch and as flattering an appearance as possible.

To solve this problem, it has been suggested that yarns be used with a noncircular cross section, e.g., multilobular yarns. However, tests made with such yarns have been disappointing, because their resistance to snagging was not greater than that of ordinary stockings.

Accordingly, until the development of the novel product, process, and apparatus of the present invention no suitable solution to the aforenoted problems was developed. Such problems, however, have now been overcome in accordance with the present invention whereby novel continuous filaments of thermoplastic material, characterized in that they comprise a helicoidal curling and/or a residual twist couple, are provided. Such novel continuous filaments of the present invention have a cross sectional shape substantially that of a bean, i.e. kidney shaped, and this shape varies slightly along the length of the filaments. As indicated previously, it is the production of such novel continuous filaments which has eliminated the problems associated with the production of a satisfactory filament for hosiery.

Accordingly, it is a principal object of the present invention to provide a novel textured yarn, a process for producing the same, and apparatus used therein, which yarn, process, and apparatus have eliminated the inherent deficiencies of the prior art.

It is a further object of the present invention to provide such a novel textured yarn particularly suited for use in the production of hosiery wherein such yarn is characterized in that the same comprises a helicoidal curling and/or a residual twist couple, with a cross section substantially like that of the shape of a bean, varying slightly along the length of the product.

A still further object of the present invention comprises a novel process for the production of such continuous filaments of thermoplastic material which comprises creating an initial twist in an individual strand or in an assembly of a number of strands having a high count per strand and a small number of strands per assembly, thermally treating the twisted strand or assembly of strands, blocking such twist at a point, and separating the individual strand or assembly of strands at this point and winding them, such process being characterized in that the point of separation of the yarns is located immediately at the outlet of the heat treatment zone when the yarns are still in a plastic state.

Yet a further object of the present invention relates to the apparatus for carrying out such process, such apparatus comprising delivery means for providing the yarn by unwinding, means for separating the strands or yarns, means for starting the twisting, means for heating the twisted yarn, and means for receiving the yarns.

Still further objects and advantages of the novel textured yarn, process for producing the same, and apparatus of the present invention will become more apparent from the following more detailed description thereof.

A preferred yarn according to the present invention is capable of great elongation. The same comprises a small number of strands, generally less than 5, each strand presenting a helicoidal curling and having at least 2 filaments with a residual twist couple, and a cross section substantially the shape of a bean, such cross section varying slightly along the length of the yarn. In a preferred form, the yarn according to the present invention comprises only 1 or 2 strands with a high count, advantageously more than 5 dtex per strand.

In accordance with the present invention the yarn can be prepared from any suitable synthetic thermoplastic material. However, it is preferred in accordance with the present invention that the yarn be prepared from conventional thermoplastic materials such as polyamides, i.e., nylon, or polyesters, i.e., polyethyleneterephthalate. Accordingly, such materials are preferred in accordance with the present invention.

The textile product, according to the present invention, prepared from the above-described filaments can be woven, knitted or not woven. In accordance with a particularly attractive form, such textile product is advantageously an elastic knit, particularly in the form of a stocking, alternately presenting a row of S twist yarn and a row of Z twist yarn. Besides its elasticity, such a knit is particularly remarkable by its flattering appearance and pleasant touch.

The novel process for the production of such continuous filaments or yarns of thermoplastic material comprises creating an initial twist in an individual strand of thermoplastic material or in an assembly of a number of strands, each strand having a high count, there being a small number of strands per assembly; thermally treating the individual twisted strand or twisted assembly of strands; blocking the twist at a point; and separating the individual strand or assembly of strands at such point and winding them. Such process comprising the present invention is characterized in that the point of separation of the individual strand or assembly of strands is located immediately at the outlet of the heat treatment zone at a time when the yarn is still in a plastic state at a temperature substantially equal to that employed during heat treatment.

By plastic state, it is meant that state in which the yarn is at such a temperature that it can be deformed, such temperature being less than the temperature at which the strands of the yarn stick together.

The assembly of strands or yarns having a high count per strand and a small number of strands are those having a count similar to those yarns normally used for the production of certain hosiery articles such as stockings. Such assembly of strands or yarns are those which preferably contain only a few strands per yarn or assembly, advantageously less than about 5 strands. Each individual strand is preferably one having a high count, preferably greater than 5 dtex.

The twist that is given to the individual strand or assembly of strands, i.e., yarn, depends somewhat upon the synthetic material that is used. However, it has been found in accordance with the present invention that such twists can be up to twist saturation.

In accordance with the process of the present invention, there is no difference whether the starting material comprises a multi-strand assembly or yarn which is subsequently separated into the elemental strands making up the same after having given them a certain twist or the starting material comprises several strands which are assembled in a first phase by twisting and then separated.

As indicated previously, after the individual strand or assembly of strands has a twist created therein, the twisted assembly, i.e., yarn or strands, is subjected to a thermal treatment. In accordance with a preferred embodiment of the present invention, the yarns or strands are drawn continuously up line from the twist zone through the thermal treatment zone such that the twist is blocked at a point located up line from such thermal treatment zone so that the initial ends are drawn in a slightly twisted or untwisted state.

The heat treatment temperature should be sufficient to permit the further fixing of the twist imparted to the yarn and the deformation of the initial section of the unit strands, but less than that which would cause their sticking. The best treatment temperature can vary, depending on the effect desired and, in particular, whether it is desired to give more or less curling. The same also depends on the length of the heat treating zone, which advantageously will be short in relation to the lengths of the zones of fixation of the processes of standard texturation. For example, for yarns of Nylon 66 at texturation rates not exceeding 300 meters per minute, this length will be less than a meter, preferably between 20 and 60 cm. In a general way, the temperature of the heating organ depends on the nature and length of this organ, the rate of pulling and the nature of the yarn.

It should be quite clear that the twist given to the strand or yarn at the beginning of the operation can be kept constant during the course of the remainder of the process. However, in accordance with a particular embodiment of the present invention, special effects can be obtained by varying the twist, for example, according to a pre-established and pre-set program. Similarly, the rate of drawing when utilized can vary, particularly when it is desired to produce a flake textured yarn.

In addition, it is pointed out that it is often possible to give an additional slackening to the yarn or strands after the separation point and before winding. This slackening may or may not be accompanied by a second heat treatment depending upon the particular characteristics to be given to the final product.

The process of the present invention can be carried out through the employment of apparatus as to be hereinafter described. Accordingly, such process will be further described in connection therewith. Such apparatus broadly comprises delivery means providing the yarn or strands by over end yarn delivery or unrolling delivery, heat treatment means, means for separating the strands or yarns, means for starting and, if desired, regulating the twist, and means for receiving the yarn. In addition, it is possible to provide an optional drawing means.

The means for regulating the twist are essential when the yarn is supplied by over end yarn delivery, because in such case, an unwinding twist from the bobbin is added to or subtracted from the twist initially given, depending on the direction of unwinding. Such means of regulation can be of any suitable type, but advantageously they can be combined with means for separating the strands and for starting the twist.

Such a regulating means is preferably made up of a mobile spindle carrying at least two arms arranged symmetrically in relation to said spindle and provided, on their free ends, with passages for the yarn, said spindle being provided with means exerting a recall couple of determined value opposing the twist couple of the yarn.

This spindle can be supported in any known way by mechanical, pneumatic or hydraulic means, but advantageously it is held in position by a magnetic element, solid therewith and exerting a repelling action on another stationary magnetic element.

The recall couple can be exerted in any known way but preferably, it is simply caused by the action of a magnetic block, in an adjustable position, located opposite a portion of the spindle of a magnetic material. It is then possible simply to regulate the value of the recall couple, and accordingly, the twist imparted to the yarn, by regulating the distance of the block from the spindle, for example, by a simple means such as a cam device.

Thus, if the twist couple becomes greater than the recall couple, the spindle can turn so as to bring the twist couple to the value provided.

Finally, a driving whorl connected to a motor that is or is not programmed can be mounted on the mobile spindle. This can make it possible to vary the twist couple if a determined program is desired.

When the yarn is unrolled or when several yarns are supplied by over end yarn delivery, it is unnecessary to have a twist regulator. Accordingly, in a preferred embodiment of the present invention, means for separating the strands or yarns are then made up of a hollow spindle carrying at its upper end at least a pin that is solid with the inside wall of the spindle, and presenting a free end so as to separate the hollow space of the spindle into two compartments freely communicating with one another, said hollow spindle turning in a stationary socket and being driven by a motor that is or is not programmed .

Due to this device for separating the yarns, it is easy to introduce and separate the elementary ends (strands or yarns), which, therefore, makes it possible to work continuously.

In accordance with the present invention, the means for thermally treating the yarns or strands can be any conventional type well known in the art. Generally, however, the heating means can comprise any suitable heating box which allows for contact heating or can simply comprise heating plates. It is certainly within the scope of the present invention, however, to employ other conventional and equivalent heating means such as a liquid bath, etc. Again, the particular heat treatment means employed in accordance with the present invention is not critical and any conventional means well known in the art can be advantageously utilized.

The present invention, including the product, process and apparatus will now be illustrated by reference to the drawings wherein FIG. 1 is a diagrammatic view illustrating one embodiment of the apparatus of the present invention;

Figure 1:
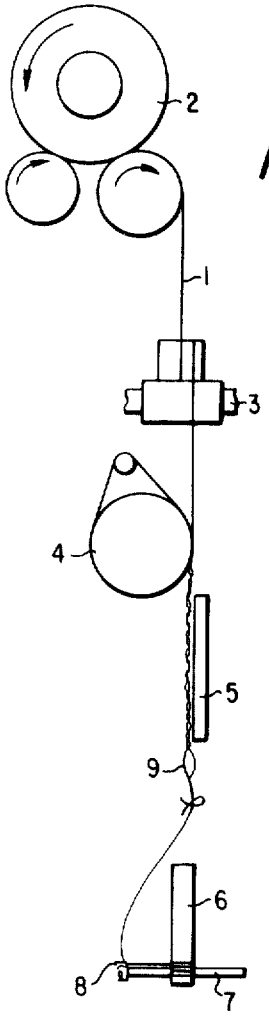

According to the apparatus diagrammatically illustrated in FIG. 1, a yarn 1 with two ends is unrolled from a bobbin 2, then is drawn between two rollers 3 and 4 before passing on a heating plate 5 and being wound on a cop 6 by a ring system 7 and a runner 8. To embody the process according to the present invention, the yarn is previously given a determined number of turns between the drawing system and receiving device in a manner well known in the art. Yarn 1 being thus twisted, the two strands are separated and a stationary pin 9 is introduced between them to block the twist. The twist located up line from this pin is definitely blocked at this point, and shoved back as the yarn advances when the delivery and drawing organs are in movement. Heating plate 5 makes it possible then to seat this twist. It is often preferable to supply this yarn by over end yarn delivery. In this case, the unwinding twist is increased or decreased (depending on the direction of unwinding), by the twist which has been given, and which is located in the heating zone. It is then necessary to provide a twist regulating device.

Figure 2:
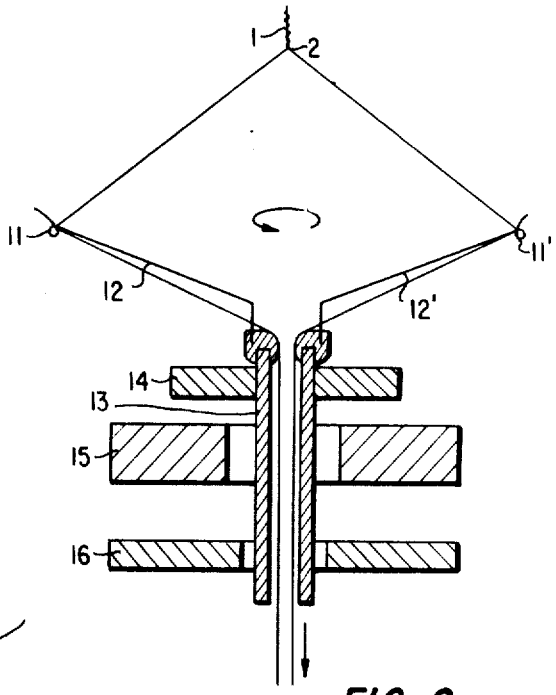
FIG. 2 is a detailed view of a self-regulating device for support and magnetic control in accordance with the apparatus of the present invention.

A first solution consists in adding a programming system to the compensating pin to maintain a constant twist coefficient. Such a solution unfortunately requires considerable means. Another simpler solution consists in providing an autoregulating system. Such a device is illustrated by FIG. 2.

Yarn 1 passes into eyelets 11 and 11' of the two separating arms 12 and 12' carried by a hollow spindle 13 and goes through the latter in the axis. This hollow spindle is held by two magnets 14 and 15. Magnet 14 is solid with spindle 13 while magnet 15 is stationary. These two magnets exert on one another a repulsion force that supports spindle 13.

The accumulated twist has a tendency to make spindle 13 turn which is braked by the action of a magnetic block 16, so that only an accumulation of normal twist coming from the spinning bobbin puts it in movement in the direction of the untwisting until the untwisting couple—magnetic brake balance is achieved again. Of course, it is possible to use any other equivalent means such as hydraulic or pneumatic support.

It is also obvious that it is possible to draw the yarn directly after spinning, then to apply to it the process according to the invention, in which case this self-regulating device is unnecessary.

Another solution, as shown in the following examples, consists in pulling two yarns instead of one (see FIG. 3). In this way, the unwinding twist in coming from the spinning bobbin is no longer harmful, because the combined play of the two yarns assures its compensation.

Figure 4:
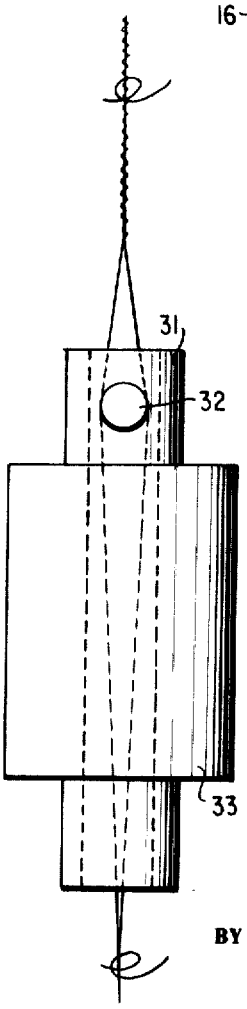
FIG. 4 is an enlarged view of the separating device used in the mounting of FIG. 3.
Figure 3:
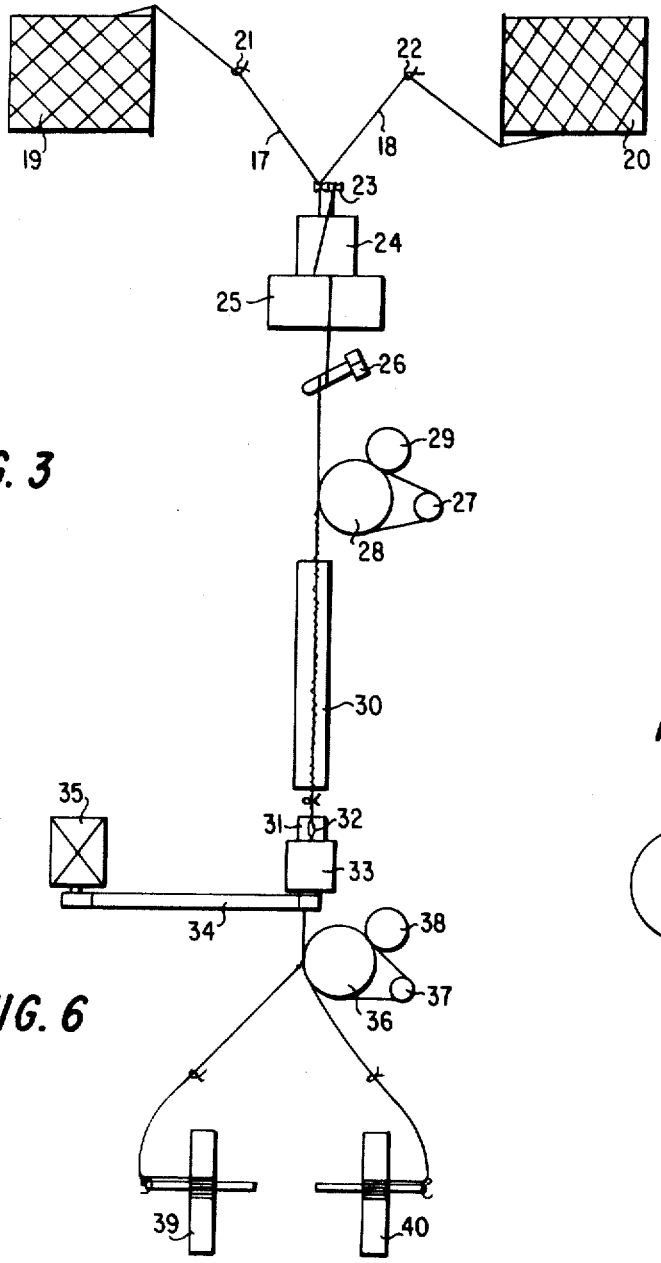
FIG. 3 is a further diagrammatic view of an alternate embodiment in accordance with the present invention.

In FIG. 3, two yarns 17 and 18 are supplied by over end yarn delivery from two bobbins 19 and 20. These yarns are brought through two yarn guides 21 and 22, a drawing device comprising a yarn guide, for example, of the barbin type 23, two rollers 24 and 25, a pin 26, and a system of drawing rollers 27 and 28. The twist is blocked, due to a roller 29. The yarn, to which a suitable initial twist is given, then passes on a heating plate 30 before passing through a separating device shown by FIG. 4. This device comprises a hollow spindle 31, provided at its upper part with a separating pin 32. Spindle 31 turns inside a stationary cylinder 33 and is driven at its lower part by a belt 34 moved by a motor 35.

The yarns then pass into a slackening device comprising three rollers 36, 37 and 38 before being received on cops 39 and 40.

Figure 5:
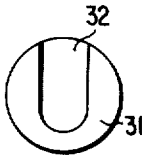
FIG. 5 is a top view of a hollow spindle employed in the separating device of FIG. 4.

A preferential arrangement of the separating pin is shown in FIG. 5. This separating pin 32 divides spindle 31 into areas connected by an open space, which allows the assembly to go into the spindle, then separates it, instead of being arranged to introduce the two ends into their sector one after the other. This arrangement of the separating pin on the inside of spindle 31 is, therefore, particularly advantageous.

Having described the product, process and apparatus of the present invention, the same will now be more clearly illustrated by reference to the following specific examples.

EXAMPLES 1 TO 9

With the aid of the device shown by 3, two monostrand yarns 109 dtex (99 den.) of polyamide 6.6 were treated by drawing them at a rate of 4.45. The length of the heating plate was 400 mm.

For these tests, there was a variation in the temperature of the heating plate, the twist, rate of drawing and rate of slackening defined by the relation:

$$\frac{\text{Drawing rate} - \text{winding rate}}{\text{Drawing rate}} \times 100$$

Figure 6:
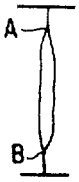
FIG. 6 is a diagrammatic view of the mounting used in accordance with the present invention to determine the value of the twist couple.

The following characteristics were found for the yarn that was obtained:

Curling, defined by the number of undulations per 2.54 cm of yarn and the twist couple expressed in turns per meter. This twist couple is measured in the following way:

A length of 2 meters is taken, one of the ends being attached to a stationary point A. The yarn is made to pass into a hook at a point B located one meter lower and then the other end is attached to point A (see FIG. 6). The yarn is released at point B by withdrawing the hook. Under the action of the residual twist, the yarn begins to curl up. With any known type of torsiometer, all that is then required is to calculate the binding twist of the two strands of yarn.

The results obtained are summed up in the following table:

J. 554-547 Sp 33 Fol 134-5 41-50 Aug 10 RUPPERT—(.9250)—DAYS—

| Ex. | Plate temp., ° C. | Initial twist in t./m. | Slackening rate | Drawing speed, m./min. | Undulation, curling/2.54 cm. | Twist couple, turns/m. |
|---|---|---|---|---|---|---|
| 1 | 20 | 3,140 | 2.7 | 110 | 5 | 0 |
| 2 | 20 | 830 | 2.7 | 110 | 0 | 0 |
| 3 | 200 | 2,050 | 2.7 | 110 | 7-6 | 0 |
| 4 | 200 | 1,500 | 2.7 | 110 | 0 | 250 |
| 5 | 200 | 830 | 2.7 | 110 | 0 | 230 |
| 6 | 240 | 2,500 | 7.15 | 110 | 10 | 230 |
| 7 | 240 | 2,340 | 7.15 | 100 | 10-11 | 250 |
| 8 | 240 | 2,340 | 7.15 | 200 | 11 | 200 |
| 9 | 240 | 2,340 | 7.15 | 300 | 11-12 | 130 |

All of these yarns are deformed so as to present a more or less pronounced bean shape.

Examples 1 and 2 illustrate the influence of the twist on curling.

Figure 7:
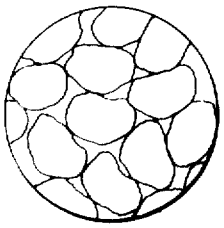
FIG. 7 diagrammatically illustrates the yarn obtained in accordance with the present invention.

Examples 3 to 9 made at normal treating temperatures in texturation show the influence of the temperature and also illustrate the flexibility of the process which makes it possible, by varying temperature and twist to have a more or less curled yarn and presenting more or less the twist couple effect. FIG. 7 gives the appearance of the yarn obtained in Example 7. A section on a bundle of yarns and not on a single yarn was made for microscopic examination.

Examples 7, 8 and 9 show the fact of increasing the drawing speed leads to a reduction of residual couple, although the latter even at 300 m/min. remains considerable. It can be noted that the speeds for producing this yarn are much greater than those of the processes of mechanical texturation.

EXAMPLE 10

The operating conditions used were identical with those of the previous examples, including the choice of yarn, only the length of the heating plate was changed from 400 mm to 25 mm. The temperature was 280° C. The initial twist on t/m was 4,000 t/m, the slackening rate was 3 percent and the drawing rate was 100 m/min.

A yarn was then obtained presenting 10 undulations per cm but without residual twist couple.

Example 10 shows the importance of the length of the heating organ. Moreover, on a circular double drop 420 needle frame, with a diameter of 3¾ inches, a stocking was knitted from a yarn according to Examples 7, 8 and 9 by alternating a row of S twist yarn with a row of Z twist yarn. The stocking obtained was fixed at 100° C for 20 minutes, then dyed at 85° C for 3 hours and postformed at 125° C for 90 seconds.

The following test was then made. On a stocking coming from the frame, a length of 100 mm. was marked off on the stocking laid flat in the slackened state. Then this stocking was slipped on to a cylindrical tube 80 mm. in diameter, before any heat treatment; to its free end was suspended a 1 kg weight and the elongation in the raw state was measured. This same measurement was repeated on the postformed stocking, which gives the elongation in the postformed state. Finally, the load was removed and the stocking was again placed flat and the distance separating the initial 100 mm markings was measured, making it possible to determine the percentage of return.

This test was applied to stockings knitted under the above-mentioned conditions, with the yarns according to Examples 7, 8 and 9.

The following results were found:

| Example | Percent raw elongation | Postformed elongation | Percent return |
|---|---|---|---|
| 7 | 260 | 200 | 195 |
| 8 | 225 | 170 | 165 |
| 9 | 195 | 170 | 155 |

It should be noted that these stockings present a great elasticity and a considerable elastic return force, because stocking was slipped on to a cylindrical tube 80 mm in back to a length very close to its initial length.

EXAMPLE 11

With the aid of a device similar to that used in the above examples, but where the drawing part has been eliminated, two yarns of ethylene polyterephthalate 22 dtex/monostrand, previously drawn at a rate of 4.1, were treated by feeding them at a speed of 100 m/min., and by pulling them at the outlet of the separation device with slackening rollers at a speed of 99 m/min. A heating plate with a length of 25 mm was brought to a temperature of 250° C. The initial twist given was 5,000 turns/m.

A yarn with a section deformed in the shape of a slightly ovalized bean was obtained with the number of undulations per inch equal to 4 and the residual twist couple of 80 turns/m.

Further, the foam effect is measured in the following way:

A skein of 2,666 dtex, 132 strands, of this yarn was soaked for 10 min. in water at 70° C, then dried in the slackened state, and left 12 hours in an atmosphere at 22° C and 65 – 70 percent humidity.

The skein was then subjected for 2 minutes to a load of 600 g. A first length L of the skein was then measured. This load was removed and replaced by a load of 4.8 g. which was left for an hour. The new length L of the skein is then measured.

The foam effect is given by the ratio $L/1 \times 100$.

In this case a value of 115 was found, which corresponds to a slight elasticity of the yarn.

It can be seen from the above examples that the process and apparatus of the present invention allow for the production of a novel textile product having greater advantages over those previously utilized in the prior art. In this regard, the textile products produced in accordance with the present invention are extremely flexible and the same can be made at speeds which are greater than those employed in standard texturation. Thus, the process of the present invention is particularly interesting industrially since it is economical and leads to the production of articles which have an attractive appearance and a pleasant touch.

What is claimed is:

1. A process for the production of continuous filaments of thermoplastic material comprising:

a. creating an initial twist in an individual strand having at least two filaments or in an assembly of a number of strands, said strands having a high count per strand and said assembly comprising a small number of strands;

b. thermally treating the twisted material of (a);

c. blocking said twist at a point located immediately after said thermal treatment; and d. separating the filaments of the twisted individual strand or the strands of the assembly of strands at said point while maintaining said material in a plastic state until subsequent to said separation and winding the filaments or strands.

2. The process of claim 1 wherein the degree of twist of the strands or assembly of strands varies.

References Cited

The following references, cited by the Examiner, are of record in the patented file of this patent or the original patent.

UNITED STATES PATENTS

| | | | |
|---|---|---|---|
| 2,890,568 | 6/1959 | Williams | 57—157 TS |
| 2,963,848 | 12/1960 | Finlaysoe et al. | 57—34 HS |
| 3,261,155 | 7/1966 | Kunzle | 57—34 HS |
| 3,310,857 | 3/1967 | Loftin et al. | 57—157 TS |
| 3,355,872 | 12/1967 | Gilchrist et al. | 57—157 TS |
| 3,448,574 | 6/1969 | Jones | 57—157 TS |
| 3,530,656 | 9/1970 | Wyatt | 57—34 HS |

JOHN PETRAKES, Primary Examiner

U.S. Cl. X.R.

57—34 HS, 106